Jan. 1, 1952 — W. R. COWDEN — 2,580,733
ADJUSTABLE CONTROL PLANE FOR FISH LURE BODIES
Filed June 20, 1947
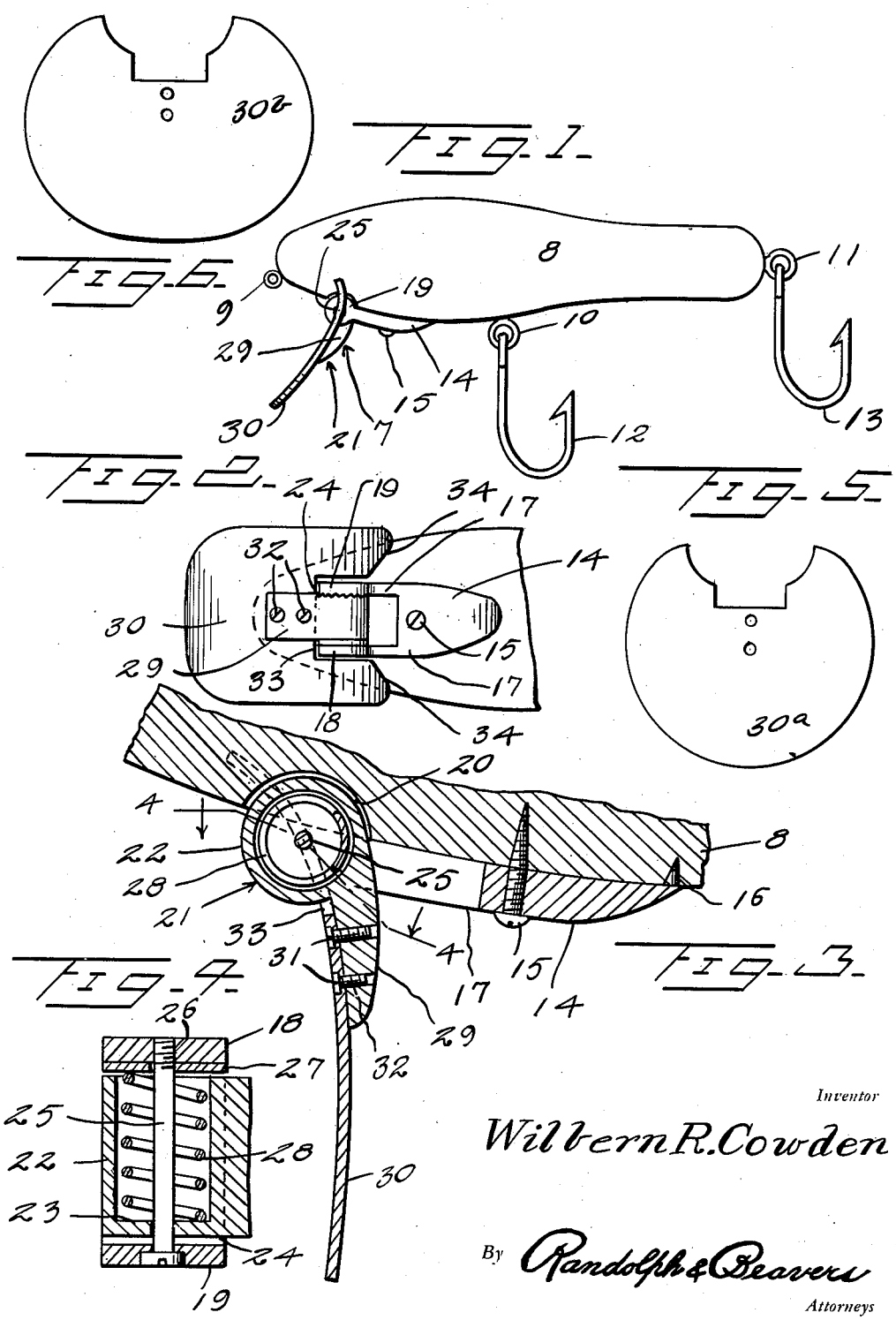
Inventor
Wilbern R. Cowden
By Randolph & Beavers
Attorneys Patented Jan. 1, 1952

2,580,733

UNITED STATES PATENT OFFICE 2,580,733

ADJUSTABLE CONTROL PLANE FOR FISH LURE BODIES

Wilbern R. Cowden, Sevierville, Tenn.

Application June 20, 1947, Serial No. 755,983

6 Claims. (Cl. 43—42.22)

This invention relates to an improved construction or adjustable actuator for lure bodies used for trolling or casting to cause the lure body, when drawn through the water to more realistically simulate the normal action of the live bait which the body simulates.

More particularly, it is an object of the invention to provide an actuator including an adjustable vane or blade disposed beneath a portion of a lure body and adjustable relatively thereto for varying the action of the lure body when drawn through the water and so that the lure body will execute diving, darting, swimming and skipping actions in the water similar to normal actions of live bait and varying depending upon the position of the vane or blade.

Still another object of the invention is to provide an improved construction of actuator for lure bodies having means whereby the vane or blade portion thereof may be readily adjusted for accomplishing the various movements of the lure body in the water and which means will effectively function to retain the blade or vane in its set position under stress or pressure incident to casting, striking or being drawn through water.

Still a further and important object of the invention is to provide an actuator so constructed that it will be disposed as close to the contour of the lure body or plug as possible in its various adjusted positions for accomplishing the most satisfactory operation thereof when in use.

Still a further object of the invention is to provide an actuator including a vane or blade a portion of which will partly encircle the lure body or plug in certain of its adjusted positions.

Various other objects and advantages of the invention will hereinafter become more fully apparent from the following description of the drawing, illustrating a preferred embodiment thereof, and wherein:

Figure 1 is a side elevational view showing the invention applied to a lure body and in one adjusted position thereof;

Figure 2 is a fragmentary bottom plan view of the forward portion of the lure body and showing the blade of the actuator in another position;

Figure 3 is an enlarged, longitudinal sectional view through a portion of the lure body and actuator and showing the blade of the latter in still another position;

Figure 4 is a sectional view taken substantially along a plane as indicated by the line 4—4 of Figure 3 rotated 180°; and Figures 5 and 6 are plan views showing other sizes and shapes of vanes or blades for interchangeable use as a part of the actuator.

Referring more specifically to the drawing, for the purpose of illustrating a preferred application and use of the actuator, constituting the invention and designated generally 7, a conventional lure body is shown at 8 which may be of any desired shape, color and figuration, depending upon the live bait intended to be simulated thereby and which is provided at its forward end with a line attaching eye 9 and at its underside and intermediate of its ends and at its rear end with hook attaching eyes 10 and 11, respectively, to which two last mentioned eyes are attached hooks 12 and 13.

The actuator 7 includes a hinge section 14 the body portion of which is secured by a detachable fastening 15 to the underside of the lure body 8, adjacent the forward end thereof and substantially intermediate of the attaching eyes 9 and 10. As seen in Figure 3, the rear end of the hinge body portion 14 is provided with a prong 16 which is adapted to be embedded in the lure body to combine with the fastening 15 to retain said portion 14 against rotation relatively to the lure body and longitudinally thereof. As seen in Figures 1 and 2, the body portion of the hinge part 14 is externally contoured to conform generally to the contour of the adjacent portion of the lure body 8 and the forward end of said portion 14 is bifurcated to provide forwardly and longitudinally extending bars 17, located adjacent the side edges of the body portion 14 and which terminate in substantially parallel disks 18 and 19 which are partially located in a transverse recess 20 in the underside of the lure body 8 and which is of arcuate cross section, as seen in Figure 3. The actuator 7 also includes a hinge section, designated generally 21 having a barrel portion 22, as best seen in Figure 4, which is adapted to be disposed between the disks 18 and 19 and one end of which is substantially closed by an end wall 23 (see Figure 4), located adjacent said disk 19. The adjacent sides of the disk 19 and end wall 23 are provided with interengaging teeth or serrations 24. A bolt 25 extends inwardly through aligned openings in the disk 19 and end wall 23 and axially through the barrel 22 and has a threaded shank end which engages a threaded opening 26 in the disk 18 for pivotally connecting the hinge section 21 to the first mentioned hinge section. The open end of the barrel portion 22 is spaced from the disk 18 and an antifriction washer 27, mounted on the bolt 25, is interposed therebetween. An expansion coiled spring 28 is contained within the barrel 22 and has one end thereof bearing against the inner side of the wall 23 and its opposite end bearing against the washer 27 for yieldably retaining the serrated faces 24 of the disk 19 and wall 23 in interengaged relationship.

The hinge section 21 also includes an arm portion 29 which extends outwardly from a part thereof and to the inner side of which is adapted to be detachably secured a blade or vane 30 by spaced fastenings 31 which extend through openings in said blade or vane and engage threaded bores or recesses 32 in the arm 29. The inner side of said arm 29, to which the vane or blade 30 is secured as best seen in Figure 3, is substantially flat while the outer side thereof is rounded and beveled outwardly, as clearly illustrated in Figures 1 and 3.

The vane or blade 30 may assume various sizes or shapes such as that as illustrated in Figure 2 or as illustrated in Figure 5 and designated generally 30a or in as seen in Figure 6 and designated generally 30b, depending upon the size of the lure body with which the actuator is intended to be used and/or the type of action desired to be accomplished thereby.

As best seen in Figure 2, the inner end of the vane or blade 30, and the same applies to the vanes 30a and 30b, is provided with a recessed or notched portion 33 to accommodate the disks 18 and 19 and the barrel 22 and therebeyond, said vane at its inner end is provided with outwardly diverging edges 34 conforming generally to the curvature of the adjacent portion of the lure body 8, adjacent which the inner end of the vane is disposed, so that the vane or blade partially encircles the lure body 8 when in its positions of Figures 1 and 3 or at substantially a right angle to the axis of said lure body. As best seen in Figures 1 and 3, the forward or upper side of the vane or blade 30 is concave due to the arcuate, longitudinal curvature thereof and for a purpose which will hereinafter become apparent.

From the foregoing it will be readily apparent that the vane or blade 30 is pivotally supported relatively to the lure body 8 by the hinge, the body portion 14 of one section of which is fixedly secured relatively to said lure body and the other section 21 of which is connected to the vane, so that the vane can be swung from a substantially parallel position to the longitudinal axis of the lure 8, as seen in Figure 2 counterclockwise to and beyond the positions of Figures 1 and 3 and to a plurality of intermediate positions, and will be retained in the various positions to which the vane or blade is set by the interengagement of the serrated faces 24 of the parts 19 and 23. The open end of the barrel 22, as seen in Figure 4, can move sufficiently toward the disk 18 to permit disengagement of the serrated faces for turning the hinge sections relatively to one another for varying the angular position of the vane 30 relatively to the lure 8 and said spring 28 will thereafter bias the barrel 22 laterally and so that the serrated faces will return to engaged positions and will thus be yieldably retained by the spring 28 against accidental movement of the vane relatively to the body 8 as a result of pressure or stress exerted on the vane in casting, striking or being drawn through the water.

It will be noted that the axis 25 of the hinge is disposed in close proximity to the adjacent portion of the contour of the lure body 8 and that the inner or upper portion of the blade 30 partially encircles the lure body in the positions of Figures 1 and 3 whereby the accurate balance and control between the vane and lure, essential to correct operation of the lure in response to the actuator 7, is accomplished.

When the blade 30 is positioned so that the free end thereof extends forwardly, as seen in Figure 2, the lure body when drawn through the water will execute deep diving and darting actions. As the vane or blade 30 is swung counterclockwise as seen in Figures 1 and 3 from its position of Figure 2 the depth of the diving movement thereof will diminish and a swimming rather than a darting action will result and further movement of the vane counterclockwise to and beyond its position of Figure 1 will result in substantially no diving action but a deep or shallow, respectively, action which very realistically simulates the swimming movement of a live bait. Movement of the vane 30 to its position of Figure 4 will result in the lure executing a swimming action close to the surface of the water when drawn therethrough and further counterclockwise movement of the vane to its rearmost extremity will cause the lure to skip along the surface of the water. Accordingly, it will be readily apparent that a plug or lure 8 may be actuated by adjustment of the vane 30 to operate in trolling or in reeling in after casting at various depths in a body of water thus enabling a fisherman to explore for the best location for fishing depending upon the season of the year, the type of fish available and other conditions affecting the location with respect to the surface and bottom of a body of water in which fish will feed and may be caught.

Various modifications and changes are contemplated and may obviously be resorted to, without departing from the spirit or scope of the invention as hereinafter defined by the appended claims.

I claim as my invention:

1. An actuator for fish lure bodies comprising a hinge having one leaf thereof adapted to be detachably fixed to the underside of a lure body, a vane or blade detachably fixed to the other leaf of said hinge and disposed beneath and transversely of the lure body and supported by the hinge completely out of contact with the lure body, and means forming a part of the hinge releasably retaining said hinge leaves in a plurality of adjusted positions relative to one another for positioning the vane or blade at a plurality of angles relative to the axis of the lure body.

2. An actuator as in claim 1, said vane or blade being bowed longitudinally throughout its length from one side edge to the other side edge thereof and having its longitudinal axis disposed longitudinally of the hinge leaf to which it is connected, and the normally forward or upper side of said vane constituting the concave side thereof.

3. An actuator as in claim 1, the axis of said hinge being disposed in close proximity to the adjacent portion of the lure body, and said vane or blade having an inner recessed end portion straddling the axis of the hinge and adapted to partially encircle a portion of the lure body in certain positions only of the vane or blade.

4. An actuator as in claim 1, said means for retaining the hinge leaves releasably in a plurality of adjusted positions including coacting, normally engaged serrated faces on portions of said hinge leaves, and a spring yieldably retaining said serrated faces in engaged relationship.

5. An actuator for lure bodies as in claim 1, said vane or blade being bowed longitudinally throughout its length and having its longitudinal axis disposed longitudinally of the hinge leaf to which it is connected, the normally forward or upper side of said vane constituting the concave side thereof, and said vane or blade having an inner recessed end portion straddling the axis of the hinge and adapted to partially encircle a portion of the lure body in certain positions only of the vane or blade.

6. An actuator as in claim 1, said vane or blade having an outer end and a recessed inner end, the axis of the hinge being disposed between said inner end and outer end of the vane or blade, portions of said recessed inner end straddling the axis of the hinge and being adapted to partially encircle a portion of the lure body in certain positions only of the vane or blade.

WILBERN R. COWDEN.

REFERENCES CITED

The following references are of record in the file of this patent:

UNITED STATES PATENTS

| Number | Name | Date |
| --- | --- | --- |
| 281,083 | Kessler | July 10, 1883 |
| 566,521 | Leger | Aug. 25, 1896 |
| 956,872 | Alger | May 3, 1910 |
| 1,220,921 | Wilson | Mar. 27, 1917 |
| 1,232,211 | Burkman | July 3, 1917 |
| 1,297,617 | Welles | Mar. 18, 1919 |
| 1,334,249 | Lane | Mar. 16, 1920 |
| 1,423,025 | Rodgers et al. | July 18, 1922 |
| 1,981,091 | Clark | Nov. 20, 1934 |
| 2,099,003 | DeWitt et al. | Nov. 16, 1937 |
| 2,158,037 | Pflueger | May 9, 1939 |
| 2,218,421 | Edgar | Oct. 15, 1940 |
| 2,234,439 | Larson | Mar. 11, 1941 |
| 2,277,453 | Phillips | Mar. 24, 1942 |